United States Patent
Sperger et al.

(10) Patent No.: US 12,440,027 B2
(45) Date of Patent: Oct. 14, 2025

(54) METHOD FOR CONNECTING A FRONT PANEL TO A DRAWER LATERAL WALL

(71) Applicant: Julius Blum GmbH, Hoechst (AT)

(72) Inventors: Gerald Sperger, Hard (AT); Claudio Gmeiner, Alberschwende (AT); Benjamin Von Der Wellen, Bludenz (AT); Michael Raffeiner, Hard (AT)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 19/018,651

(22) Filed: Jan. 13, 2025

(65) Prior Publication Data
US 2025/0143461 A1 May 8, 2025

Related U.S. Application Data

(63) Continuation of application No. PCT/AT2023/060218, filed on Jul. 6, 2023.

(30) Foreign Application Priority Data

Jul. 21, 2022 (AT) .................................. 50550/2022

(51) Int. Cl.
*A47B 88/95* (2017.01)
*A47B 88/407* (2017.01)
*B23B 47/28* (2006.01)

(52) U.S. Cl.
CPC ............ *A47B 88/95* (2017.01); *A47B 88/407* (2017.01); *B23B 47/287* (2013.01); *A47B 2088/952* (2017.01)

(58) Field of Classification Search
CPC ..... A47B 88/95; A47B 88/407; A47B 88/423; A47B 2088/95; B23B 47/287
See application file for complete search history.

(56) References Cited

U.S. PATENT DOCUMENTS 2,990,733 A * 7/1961 Garcia .................. B23B 47/287
  101/112
5,222,791 A   6/1993 Held et al.
(Continued)

FOREIGN PATENT DOCUMENTS

DE   20 2011 106 765    3/2013
EP      0 439 748       8/1991
(Continued)

OTHER PUBLICATIONS

International Search Report issued Oct. 4, 2023 in International (PCT) Application No. PCT/AT2023/060218.
(Continued)

*Primary Examiner* — Jermie E Cozart
(74) *Attorney, Agent, or Firm* — Wenderoth, Lind & Ponack, L.L.P.

(57) ABSTRACT

In a method of mounting a front panel on a drawer side wall for a drawer, the drawer side wall has a connecting device for connecting a front panel to the drawer side wall, an end face facing the front panel to be connected, and a marking device for marking a position for a drill hole in the front panel, and the marking device projects beyond the end face of the drawer side wall. The method includes: marking a position for a drill hole on the front panel by the one marking device of the drawer side wall, making a drill hole in the front panel at the marked position, and mounting a front panel holding device on the front panel via the drilled hole. The front panel is then connected to the drawer side wall by connecting the front panel holding device to the connecting device.

17 Claims, 7 Drawing Sheets

(56) References Cited

U.S. PATENT DOCUMENTS 5,352,034 A 10/1994 Held et al.
5,507,607 A * 4/1996 Ericksen ............... B23B 47/287
408/115 R

FOREIGN PATENT DOCUMENTS

EP 3 808 997 4/2021
WO WO-9009254 A * 8/1990 ........... B23B 47/287

OTHER PUBLICATIONS

Hettich Group, Installing AvanTech You front panels with BlueJig 105 drilling jig, May 5, 2020, Retrieved from the interview: https://www.youtube.com/watch?v=B9vNRHRj2a4.

Hettich Group, "BlueJig marking jig: Assembly of ArciTech drawer front panels", Aug. 14, 2014, Retrieve from the internet: https://www.youtube.com/watch?v=qbi-x7y6W1Y.

* cited by examiner

METHOD FOR CONNECTING A FRONT PANEL TO A DRAWER LATERAL WALL

The present application is a continuation of International Application PCT/AT2023/060218 filed on Jul. 6, 2023. Thus, all of the subject matter of International Application PCT/AT2023/060218 is incorporated herein by reference.

BACKGROUND OF THE INVENTION

The invention relates to a method for mounting at least one front panel on at least one drawer side wall.

When mounting a front panel on a drawer side wall, it is important that the front panel is precisely aligned relative to the drawer side wall in order to achieve a uniform joint pattern. One challenge is to place holes for connecting elements in the front panel in the correct positions, wherein the positions are usually measured manually, which is time-consuming and can be associated with measurement inaccuracies.

DE 202011106765 U1 discloses a front wall fitting with a front wall holder attached to it, with fastening screws inserted into the front wall bracket.

EP 0439748 A2 discloses a solution in which the front wall fitting must first be connected to the front wall and then the front wall fitting is connected to the front wall holder. Without the front wall, the front wall fitting could not be held in position by the front wall holder.

SUMMARY OF THE INVENTION

The object of the present invention is to provide a method for mounting at least one front panel on at least one drawer side wall, which method is improved compared to the prior art, and by which the disadvantages known from the prior art are at least partially eliminated.

If a front panel is to be mounted on the drawer side wall, a fitter only has to align the front panel relative to the drawer side wall, and the at least one position for a drill hole in the front panel is automatically marked by means of the at least one marking coupling. Therefore, time-consuming and potentially inaccurate position measurements are no longer necessary. In a subsequent step, the hole can be drilled into the front panel at the marked position.

Accordingly, the inventor have provided a method for mounting at least one front panel on at least one drawer side wall, which uses at least one marking coupling for marking at least one position for a drill hole in the front panel, in which the marking device (i.e., marking coupling) projects beyond the front side of the drawer side wall. The method includes: at least one position for a drill hole is marked on the front panel by the at least one marking device of the drawer side wall, and preferably at least one marker of the marking device comes into contact with the front panel at the position to be marked. At least one drill hole is made in the front panel at the at least one marked position, and at least one front panel holding device, in form of the at least one marking device, is mounted on the front panel via at least one fastening element, preferably in the form of a screw, via the at least one drilled hole. The front panel is then connected to the at least one drawer side wall by connecting the front panel holding device to the at least one connecting device.

According to a preferred embodiment, the marking device has at least one marker projecting beyond the front side of the drawer side wall, and the marker has at least one, preferably substantially conical, tip which penetrates into a material of the front panel to be connected at the position to be marked.

Alternatively or additionally, the marking device has at least two markers projecting beyond the front side of the drawer side wall, and preferably the markers are spaced apart from one another in a direction transverse to a longitudinal direction of the drawer side wall. In this way, at least two positions for a drill hole in the front panel can be marked simultaneously.

It has proven to be particularly advantageous that the marking device not only serves to mark at least one position for a drill hole in the front panel, but simultaneously fulfills at least one other function. Thus, the marking device is designed as a front panel holding device in order to connect the front panel to the drawer side wall via the at least one connecting device, and/or the marking device is designed as a drawer bottom support device in order to support a drawer bottom, preferably centrally, on the front panel to be connected, and/or the marking device can be mounted on the front panel to be connected, preferably by screwing and/or plugging.

Thus, according to advantageous embodiments of the method, the at least one marking device is detached from the at least one drawer side wall in a further step, and/or at least one front panel holding device, preferably the at least one marking device, is mounted on the front panel in a further step via at least one fastening element, preferably in the form of a screw, via the at least one drill hole. Preferably, the front panel is then connected to the at least one drawer side wall by connecting the front panel holding device to the at least one connecting device, and/or at least one drawer bottom support device, preferably the at least one marking device, is connected to the front panel, preferably centrally, in a further step and at least one drawer bottom is supported on the drawer bottom support device.

BRIEF DESCRIPTION OF THE DRAWINGS

Further details and advantages of the invention are explained in more detail below with reference to the drawings, in which:

FIGS. 6-8 show a first exemplary embodiment of a connecting device for connecting a front panel to the drawer side wall, in which FIG. 6 shows a perspective view, FIG. 8 an exploded view, and FIG. 7 the adjustment of a connecting element relative to the connecting device.

DETAILED DESCRIPTION OF THE INVENTION

Figure 1:
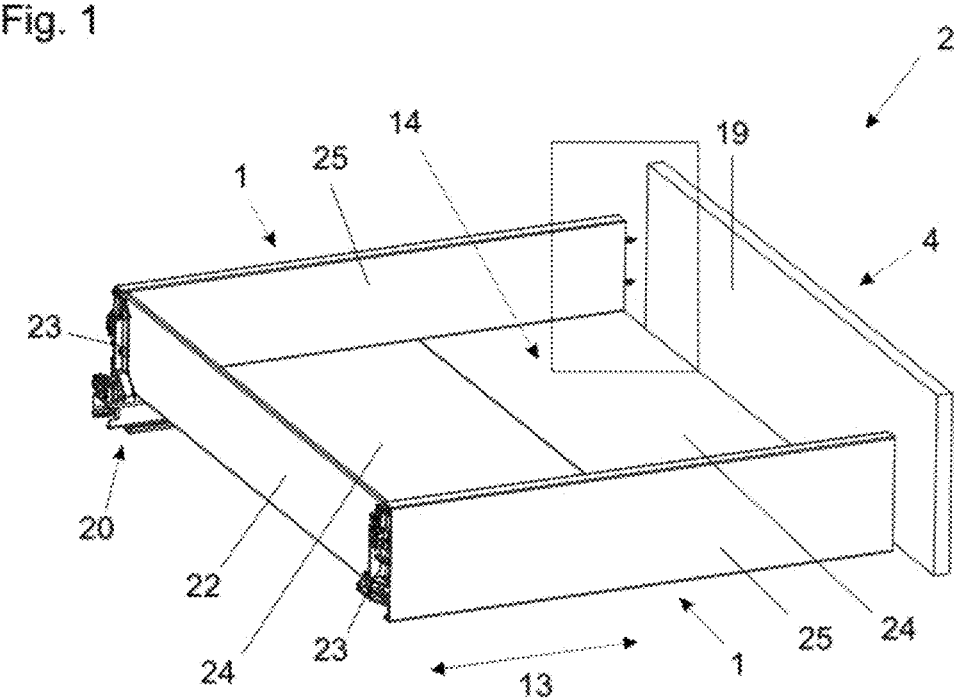
FIG. 1 shows a drawer with a front panel to be mounted in a perspective view.
Figure 2:
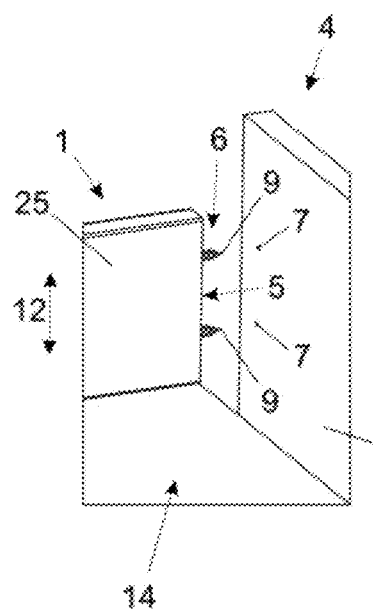
FIGS. 2-4 show an enlarged section of FIG. 1 to illustrate the mounting of the front panel.
Figure 3:
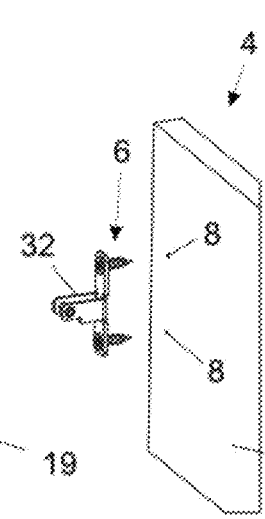
Figure 4:
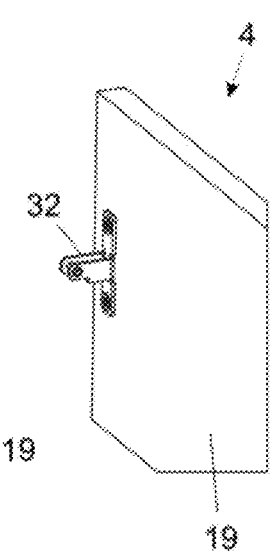

FIG. 1. shows a drawer 2 with a front panel 4 to be mounted in a perspective view, FIGS. 2 to 4 show the section marked in FIG. 1 to illustrate the mounting of the front panel 4.

The drawer 2 comprises a drawer side wall 1 with at least one connecting device 3 for, preferably detachably, connecting a front panel 4 to the drawer side wall 1, and the drawer side wall 1 has a front end face 5 facing the front panel 4 to be connected. The drawer side wall 1 has at least one marking device (i.e., marking coupling) 6 for marking at least one position 7 for a drill hole 8 in the front panel 4, wherein the marking coupling 6 projects beyond the front side 5 of the drawer side wall 1.

The drawer side wall 1 can comprise at least one hollow profile 25 in which the connecting device 3 is arranged at least in some portions.

The drawer 2 comprises a drawer bottom 14 that can be connected to the drawer side wall 1 and/or the front panel 4. The drawer bottom 14 can be divided into segments 24, e.g. two segments 24.

The marking device (marking coupling) 6 includes at least one marker 9 projecting beyond the front end face 5 of the drawer side wall 1. The marker 9 has at least one, preferably substantially conical, tip that can penetrate into a material of the front panel 4 to be connected and is part of a fastening element, preferably in the form of a screw, a nail, or a clamp. In the case shown, the marker 9 is part of a fastening element in the form of a screw.

As in the case shown, the marking coupling 6 can include two markers 9 projecting beyond the front side 5 of the drawer side wall 1, wherein the markers 9 are spaced apart from one another in a direction 12 transverse to a longitudinal direction 13 of the drawer side wall 1. The marking coupling 6 can be mounted on the front panel 4 to be connected; (in the specific case shown) by screws.

The marking coupling 6 is configured to be a front panel holding device in order to connect the front panel 4 to the drawer side wall 1 via the at least one connecting device 3.

The marking coupling 6 can comprise at least one connecting element 32, which has for example a U-shaped cross-section. The screws or the markers 9 can be mounted on the connecting element 32.

In a state connected via the at least one connecting device 3, the front end face 5 of the drawer side wall 1 contacts an inner side 19 of the front panel 4 facing the drawer side wall 1, at least in partially.

In order to mount the front panel 4 on the at least one drawer side wall 1, it according to a preferred exemplary embodiment of the invention, at least one position 7 for a drill hole 8 on the front panel 4 is marked by the at least one marking device 6 of the drawer side wall 1. The at least one marker 9 of the marking device 6 comes into contact with the front panel 4 at the position 7 to be marked while attached to the drawer side wall 1 (see FIG. 2). In a further step, at least one drill hole 8 is made in the front panel 4 at the at least one marked position 7 (FIG. 3).

In a further step, the at least one marking device 6 is detached from the at least one drawer side wall 1 (see FIG. 3).

The at least one marking device (marking coupling) 6, which is also configured to be a front panel holding device, is mounted in a further step via at least one fastening element, preferably in the form of a screw, via the at least one drill hole 8 on the front panel 4 (cf. FIG. 4), and the front panel 4 is then connected to the at least one drawer side wall 1 by connecting the front panel holding device to the at least one connecting device 3.

Figure 5:
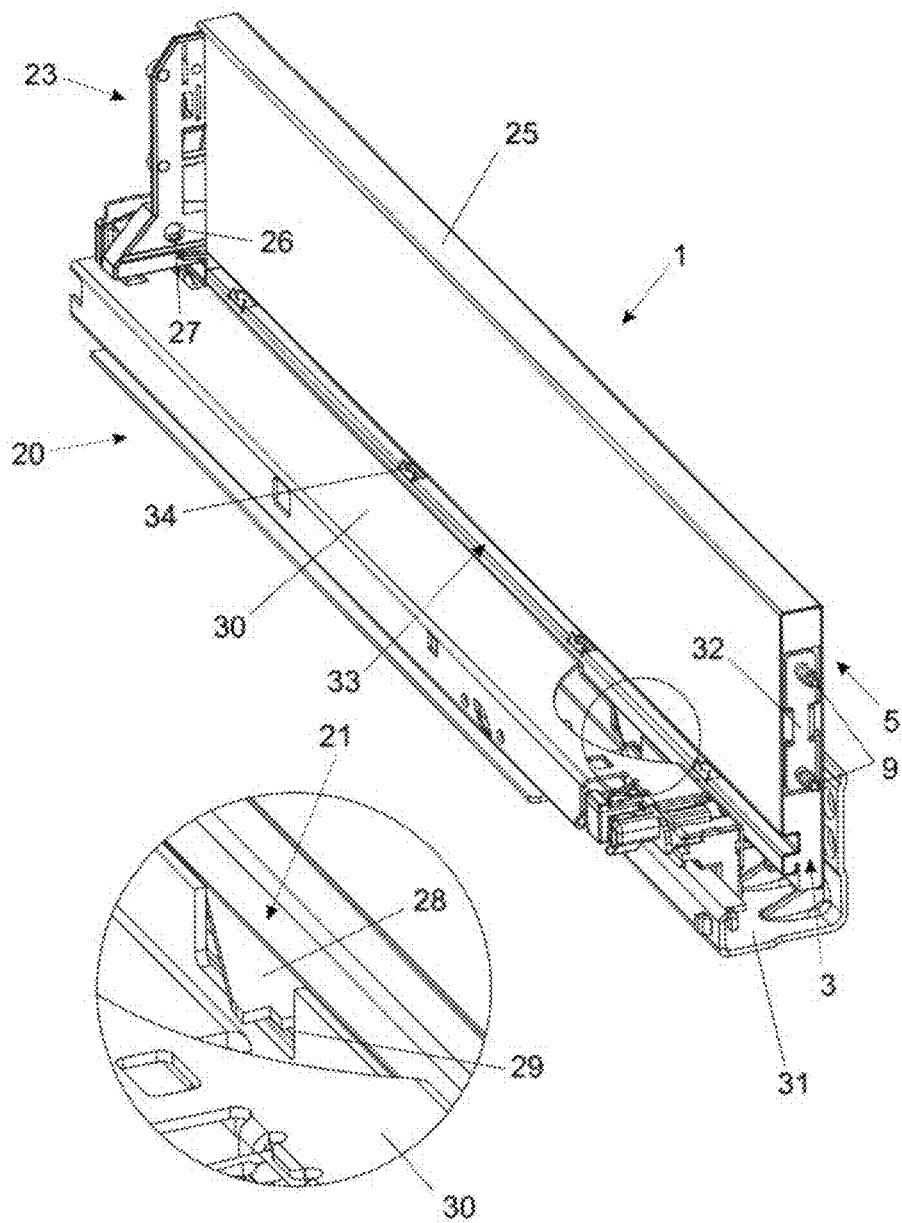
FIG. 5 shows an arrangement composed of a drawer side wall and a drawer extraction guide in a perspective view.

FIG. 5 shows an arrangement composed of a drawer side wall 1 and a drawer extraction guide in a perspective view.

The drawer extraction guide 20 has a body rail 31 to be connected to a furniture body and a drawer rail 30 which is mounted so as to be movable relative thereto.

At least one wall coupling 21 is provided, with which the drawer side wall 1 can be coupled, preferably detachably, to the drawer extraction guide 20. The drawer rail 30 is shown broken open in the area of the wall coupling 21 for better visibility. The wall coupling 21 can have a coupling lever 28 and a coupling contour 29 cooperating therewith, and the coupling lever 28 can be formed, for example, on the drawer side wall 1 and the coupling contour 29 on the drawer rail 30, or vice versa.

Figure 20:
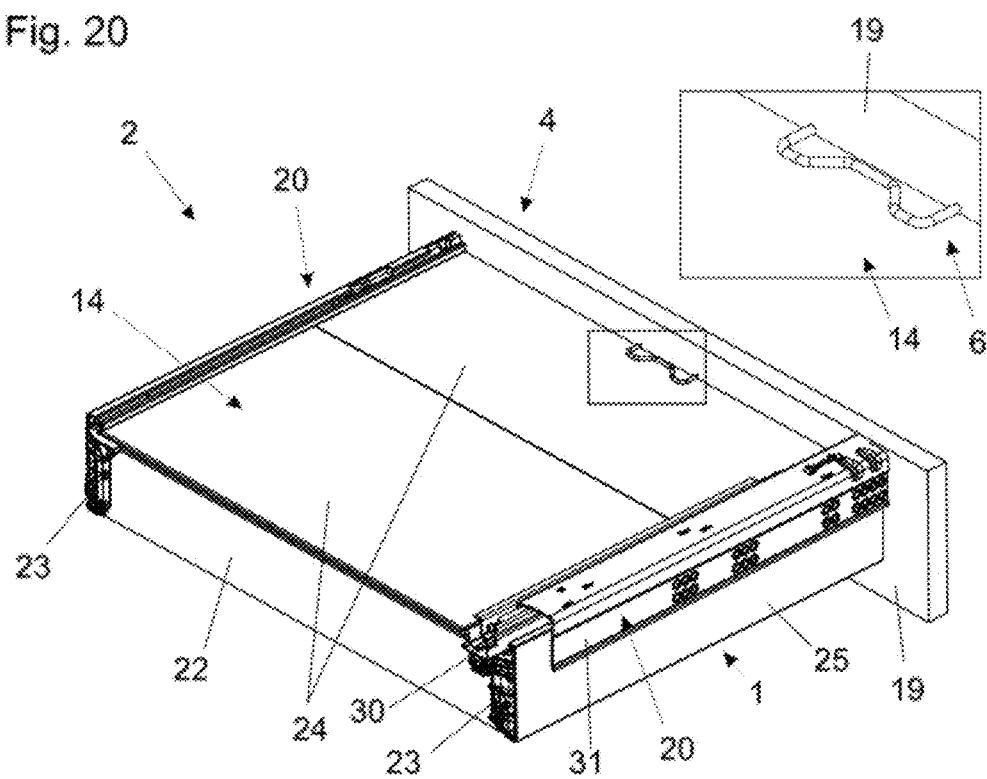
FIG. 20 shows a drawer in a perspective view from below, wherein the marking device of FIGS. 18 and 19 supports the drawer bottom.

As shown in FIG. 20, the arrangement can also comprise a rear wall 22 that can be arranged parallel to the front panel. The drawer side wall 1 comprises at least one rear wall coupling 23, via which the rear wall 22 can be connected to the drawer side wall 1, preferably detachably. The rear wall coupling 23 can be arranged at least partially in the drawer side wall 1.

The drawer side wall 1 can be connected to the drawer extraction guide 20 via the rear wall coupling 23. For this purpose, a hook 27 arranged on the drawer rail 30, preferably in an adjustable manner, can engage in an opening 26 in the rear wall coupling 23 (see FIG. 5).

A groove 33 can be arranged in the drawer side wall 1, in which an edge of a drawer bottom 14 can be mounted. A fastener such as barbs 34, can be provided for fastening the drawer bottom 14 to the drawer side wall 1 or the groove 33, preferably without the use of tools.

Figure 6:
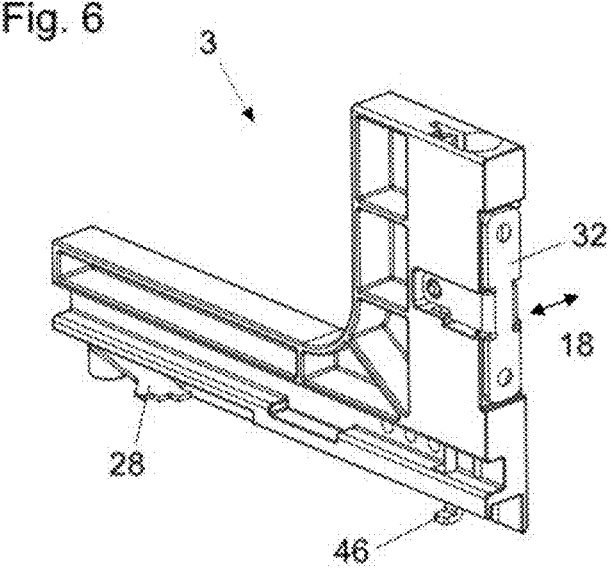
Figure 7:
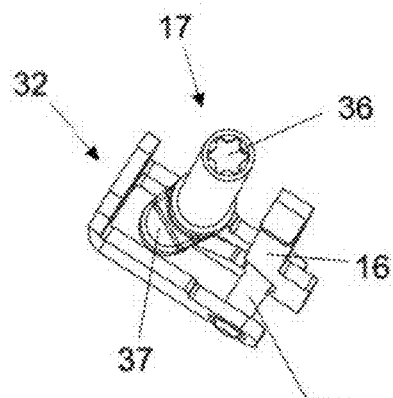
Figure 8:
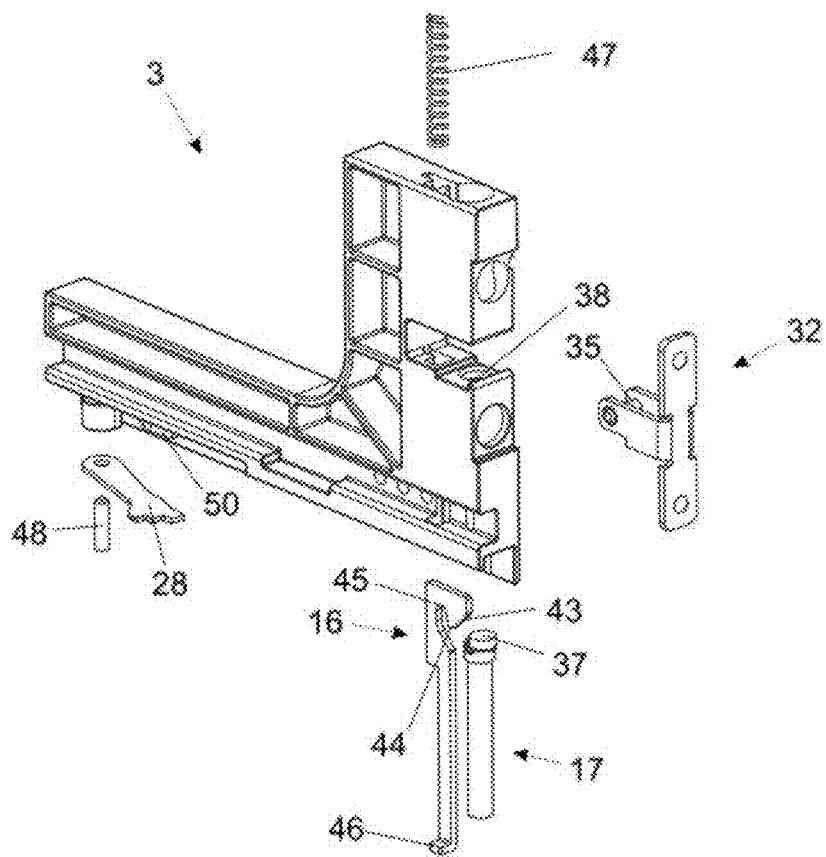
Figure 9:
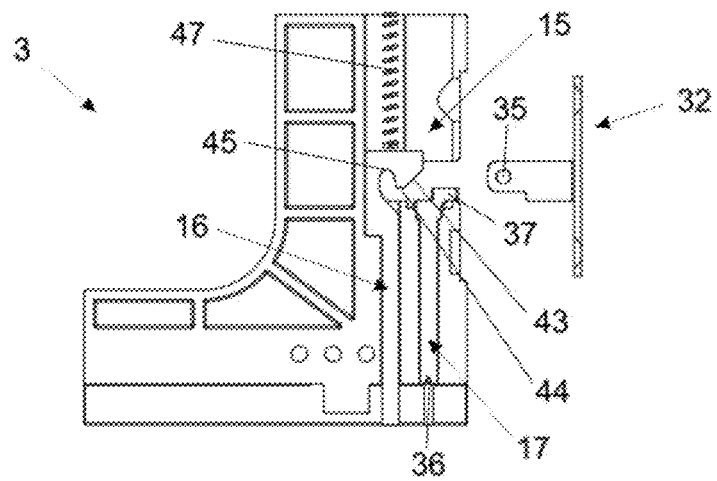
FIGS. 9-11 are a sequence of figures to illustrate the connection of the connecting element with the connecting device according to the first exemplary embodiment, each in a cross-sectional view.

FIGS. 6-8 show a first exemplary embodiment of a connecting device (wall connector) 3 for connecting a front panel 4 to the drawer side wall 1, wherein FIG. 6 shows a perspective view, FIG. 8 an exploded view and FIG. 7 the adjustment of a connecting element relative to the connecting device 3. In addition, FIGS. 9 to 11 show a sequence of views to illustrate the connection of the connecting element 32 to the connecting device 3.

The connecting device 3 has at least one fastener 15, via which the marking device 6 or the connecting element 32 is fastened, preferably detachably, to and/or in the connecting device (wall connector) 3.

For this purpose, the fastener (fastening device) 15 can have at least one spring-loaded and displaceably mounted fastening latch 16 as in the case shown. A spring 47 is provided, which applies a force to the fastening latch 16 in the direction of a fastening position.

Figure 10:
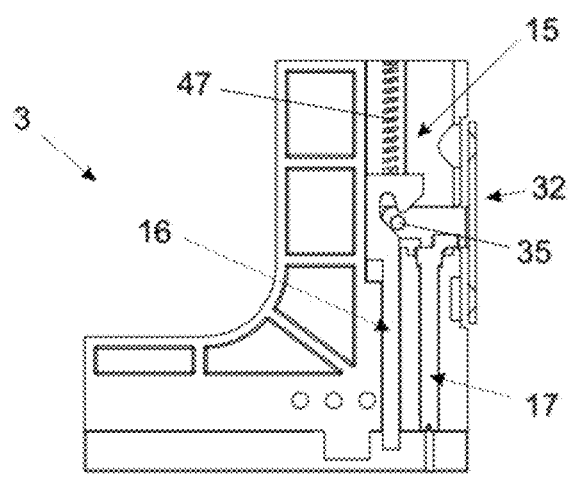
Figure 11:
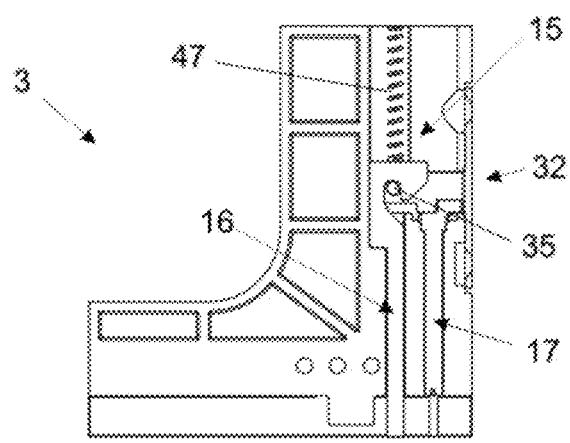

To connect the connecting element 32 to the fastening latch 16, a bolt 35 of the connecting element 32 comes into contact with an inclined surface 43 of the fastening latch 16, and the fastening latch 16 is urged against the force of the spring 47 from the fastening position into a release position (cf. FIG. 10). The bolt 35 overcomes a nose 44 and, under the influence of the spring force, enters a recess 45 (see FIG. 11), and the fastening latch 16 is moved back into the fastening position.

For unlocking, the fastening latch 16 has an actuator 46 on its underside.

At least one adjustment device (position adjuster) 17 is provided, with which the marking marking coupling 6 can be adjusted at least in a direction 18 transverse to a longitudinal direction 13 of the drawer side wall 1 relative to the drawer side wall 1.

The adjustment device 17 can, as in the case shown in FIGS. 8 and 9, have a cylindrical rod, which comprises an actuating element 36 at a first end and an eccentric 37 at a second end opposite the first end. The rod can be mounted in a corresponding recess 38 of a base body of the connecting device 3. When the adjustment device 17 is actuated, the eccentric 37, which is engaged with the connecting element 32 or can be brought into engagement with it, displaces the connecting element 32 in a direction 18 transverse to a longitudinal direction 13 of the drawer side wall 1 relative to the drawer side wall 1.

The coupling lever 28 is mounted on the connecting device 3 so as to be rotatable about a rotation axis 48. A spring element 50 is provided, which applies a force to the coupling lever 28 in the direction of a coupling position.

Figure 12:
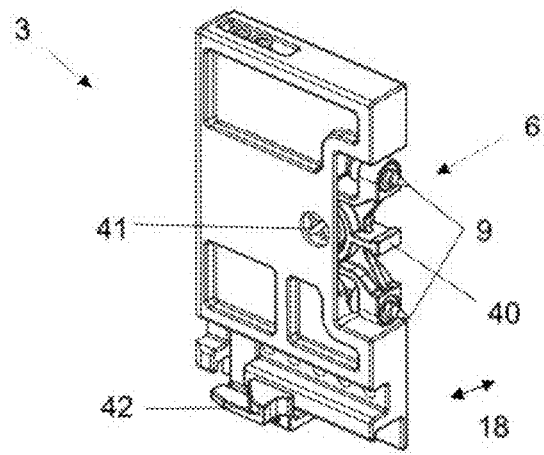
FIGS. 12, 13 show a second exemplary embodiment of a connecting device for connecting a front panel to the drawer side wall, in which FIG. 12 showing a perspective view and FIG. 13 an exploded view.
Figure 13:
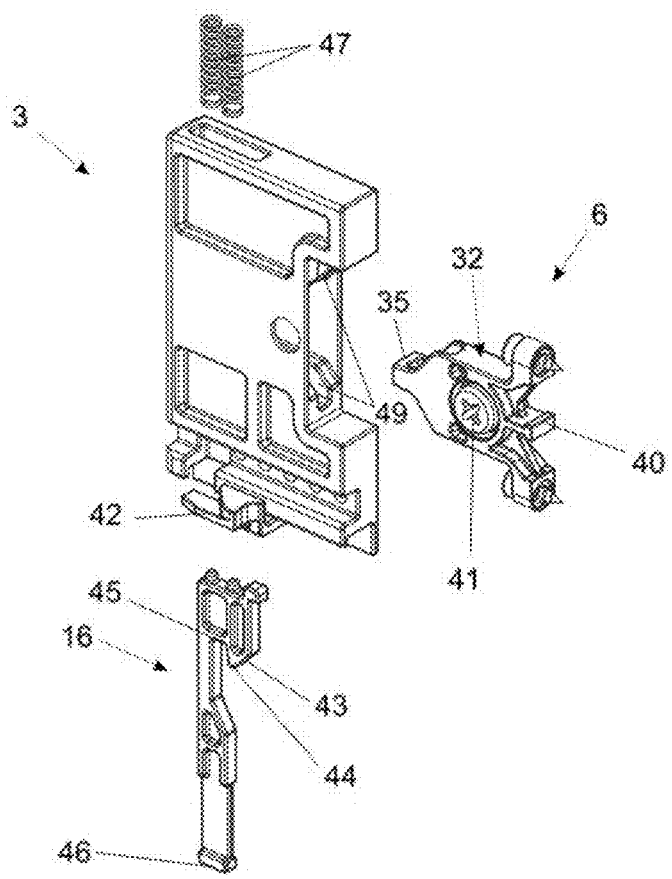
Figure 14:
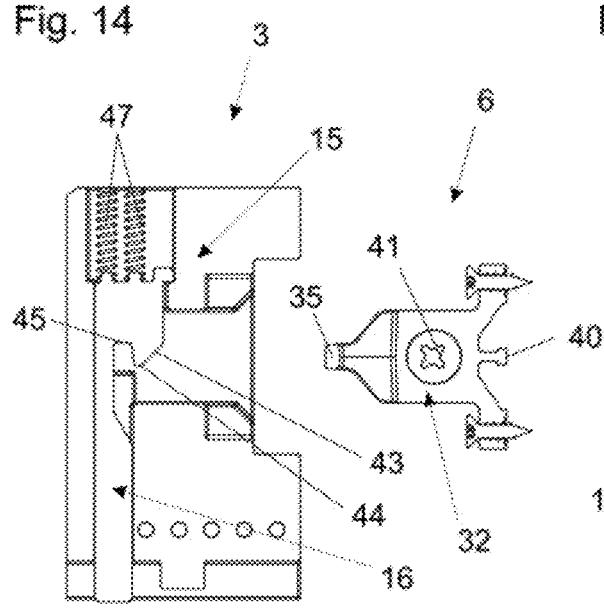
FIGS. 14-17 show a sequence of figures to illustrate the connection of the connecting element with the connecting device according to the second exemplary embodiment, each in a cross-sectional view.
Figure 15:
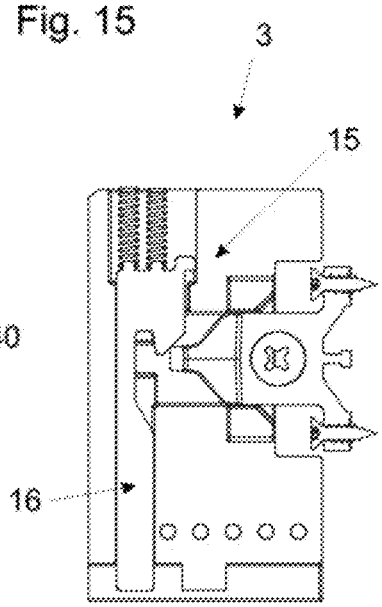
Figure 16:
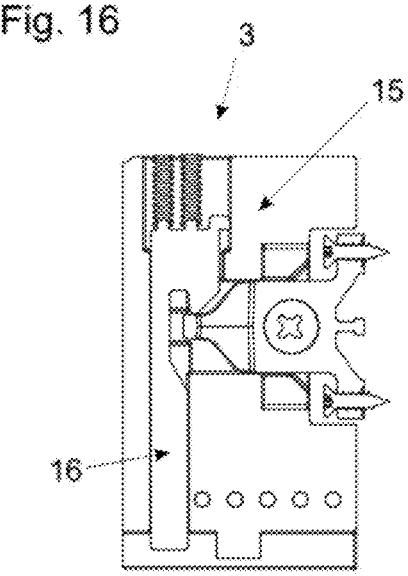
Figure 17:
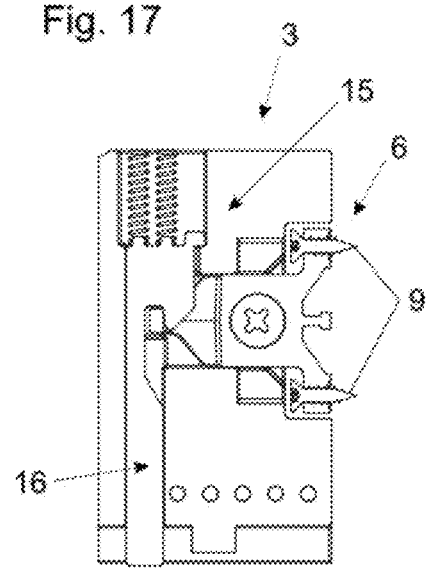

FIGS. 12 and 13 show a second exemplary embodiment of a connecting device 3 for connecting a front panel 4 to the drawer side wall 1. FIGS. 14 to 17 show a sequence of figures to illustrate the connection of a connecting element 32 to the connecting device 3.

The functional principle and basic structure of the connecting device 3 are essentially the same as those of the connecting device 3 according to the first exemplary embodiment.

The connecting element 32 comprises a base body made of plastic. Two screws, which serve as markers 9 in the sense of the present invention, are mounted in the base body. A support foot which can be placed on the front panel 4 to be connected is arranged between the markers 9.

At least one adjustment device 17 is provided, with which the marking device (marking coupling) 6 can be adjusted at least in a direction 18 transverse to a longitudinal direction 13 of the drawer side wall 1 relative to the drawer side wall 1. The adjustment device 17 comprises an adjustment screw 41, which is rotatably mounted in the base body of the connecting element 32.

For coupling the drawer side wall 1 to a drawer guide 20, the connecting device wall connector) 3 has at least one coupling element 42, which can be gripped around by a coupling lever mounted on the drawer extraction guide 20 for coupling.

Figure 18:
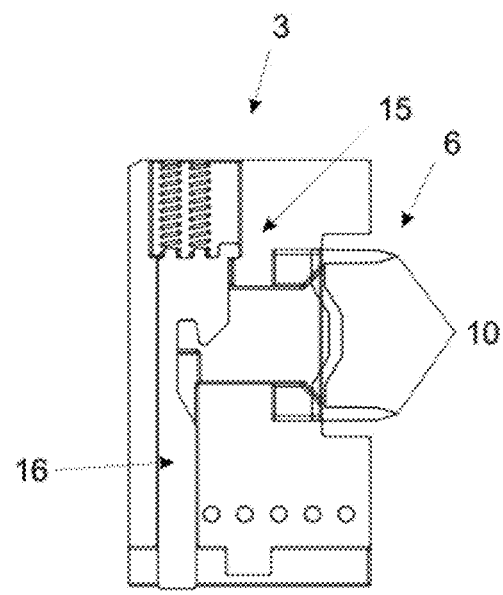
FIGS. 18, 19 show the connecting device according to the second exemplary embodiment with an inserted marking device (marking coupling) in the form of a clamp in a cross-sectional view, the marking device being shown in isolation in FIG. 19.
Figure 19:
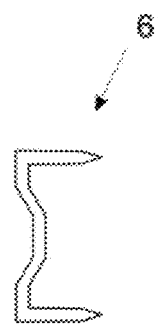

FIGS. 18 and 19 show the connecting device 3 according to a second exemplary embodiment with an inserted supporting marking coupling 6 in the form of a clamp. FIG. 20 shows a drawer 2 in a perspective view from below, wherein the supporting marking coupling 6 is inserted into the front panel 4 and supports the drawer bottom 14 in the middle.

The supporting marking coupling 6 is designed as a drawer bottom support device in order to support a drawer bottom 14, preferably centrally, on the front panel 4 to be connected.

The supporting marking coupling 6 can be inserted into the wall connector 3 in a first operating position for marking at least one position 7 for a drill hole 8 in the front panel 4 (see FIG. 18). For this purpose, the wall connector 3 can have a receiving contour 49 (see FIG. 13).

The supporting marking coupling 6 can then be removed from the connecting device (wall connector) 3 (see FIG. 19) and connected to the front panel 4, preferably centrally, preferably by inserting the tips 10 into corresponding holes. The supporting marking coupling 6 can support at least one drawer bottom 14.

The invention claimed is:

1. A method of mounting a front panel on a drawer side wall for a drawer, wherein the drawer side wall includes a wall connector to detachably connect the front panel to the drawer side wall, an end face to face the front panel to be connected, and a marking coupling to mark at least one position for a drill hole in the front panel, wherein the marking coupling projects beyond the end face of the drawer side wall, the method comprising:

marking the at least one position for a drill hole on the front panel using the marking coupling of the drawer side wall, making the drill hole on the front panel at the at least one marked position, and mounting the marking coupling on the front panel via a fastener and the drilled hole, and after the mounting of the marking coupling on the front panel, connecting the front panel to the drawer side wall by connecting the marking coupling to the wall connector.

2. The method according to claim 1, wherein the marking coupling is attached to the drawer side wall during the marking, and is detached from the drawer side wall after the marking and prior to the mounting of the marking coupling on the front panel.

3. The method according to claim 1, further comprising connecting a supporting marking coupling to the front panel so as to extend from an inner surface of the front panel to support a drawer bottom thereon.

4. The method according to claim 1, wherein the marking coupling has a marker projecting beyond a front side of the drawer side wall when the marking coupling is attached to the drawer side wall, and the marker has a tip configured to penetrate into a material of the front panel at the position to be marked.

5. The method according to claim 4, wherein the tip of the marker is conical.

6. The method according to claim 1, wherein the marking coupling has at least two markers projecting beyond a front side of the drawer side wall when the marking coupling is attached to the drawer side wall so that at least two positions for a drill hole in the front panel are marked simultaneously.

7. The method according to claim 6, wherein the markers are spaced apart from one another in a direction transverse to a longitudinal direction of the drawer side wall.

8. The method according to claim 1, wherein the wall connector includes a fastener configured to detachable fasten the marking coupling to the wall connector.

9. The method according to claim 1, further comprising adjusting a position at which the marking coupling is connected to the wall connector along at least in a direction transverse to a longitudinal direction of the drawer side wall relative to the drawer side wall by a position adjuster of the wall connector.

10. The method according to claim 1, wherein the connecting of the front panel to the drawer side wall is performed via the wall connector and the marking coupling such that that a front side of the drawer side wall at least partially contacts an inner side of the front panel facing the drawer side wall.

11. The method according to claim 10, further comprising supporting the drawer side wall on a drawer guide.

12. The method according to claim 11, wherein the drawer side wall is detachably coupled to the drawer guide by a wall coupling.

13. The method according to claim 10, wherein the drawer has a drawer bottom connected to the drawer side wall and/or to the front panel.

14. The method according to claim 10, wherein the drawer has a rear wall arranged parallel to the front panel, and the method further comprising detachably connecting the drawer side wall to the rear wall via a rear wall coupling.

15. The method according to claim 1, wherein a marker of the marking coupling contacts the front panel at the at least one position to be marked.

16. The method according to claim 1, wherein the fastener is a screw.

17. A method of mounting a front panel on a drawer side wall for a drawer, wherein the drawer side wall includes a wall connector to detachably connect the front panel to the drawer side wall, an end face to face the front panel to be connected, and a supporting marking coupling to mark at least one position for a drill hole in the front panel, wherein the supporting marking coupling projects beyond the end face of the drawer side wall, the method comprising:
   marking the at least one position for a drill hole on the front panel using the supporting marking coupling,
   making the drill hole on the front panel at the at least one marked position, and
   mounting the supporting marking coupling on the front panel so as to extend from an inner surface of the front panel toward a drawer bottom to support the drawer bottom.

\* \* \* \* \*